(12) United States Patent
Schmitt

(10) Patent No.: US 12,085,506 B2
(45) Date of Patent: Sep. 10, 2024

(54) METHOD FOR DETERMINING THE REFRACTIVE-INDEX PROFILE OF A CYLINDRICAL OPTICAL OBJECT

(71) Applicant: Heraeus Quarzglas GmbH & Co. KG, Hanau (DE)

(72) Inventor: Maximilian Schmitt, Buford, GA (US)

(73) Assignee: Heraeus Quarzglas GmbH & Co. KG, Hanau (DE)

(*) Notice: Subject to any disclaimer, the term of this patent is extended or adjusted under 35 U.S.C. 154(b) by 0 days.

(21) Appl. No.: 17/907,215

(22) PCT Filed: Mar. 18, 2021

(86) PCT No.: PCT/EP2021/056922
§ 371 (c)(1),
(2) Date: Sep. 23, 2022

(87) PCT Pub. No.: WO2021/197857
PCT Pub. Date: Oct. 7, 2021

(65) Prior Publication Data
US 2023/0107854 A1  Apr. 6, 2023

(30) Foreign Application Priority Data
Mar. 30, 2020 (EP) .................... 20166718

(51) Int. Cl.
*G01N 21/41* (2006.01)
(52) U.S. Cl.
CPC ...... *G01N 21/412* (2013.01); *G01N 21/4133* (2013.01); *G01N 2021/4153* (2013.01)

(58) Field of Classification Search
CPC ...... G01N 21/4133; G01N 2021/4153; G01M 11/0207; G01M 11/0285; G01M 11/37
See application file for complete search history.

(56) References Cited

U.S. PATENT DOCUMENTS

| 4,227,806 A | * | 10/1980 | Watkins | ............... | G01N 21/412 356/73.1 |
| 4,441,811 A | * | 4/1984 | Melezoglu | ........... | G01N 21/412 356/73.1 |

(Continued)

FOREIGN PATENT DOCUMENTS

| CN | 110095262 A | * | 8/2019 | ........ | G01M 11/0257 |
| DE | 3816246 C2 | | 10/1992 | | |

(Continued)

*Primary Examiner* — Hwa Andrew Lee
(74) *Attorney, Agent, or Firm* — Dicke, Billig & Czaja, PLLC

(57) ABSTRACT

A method for determining an index-of-refraction profile of an optical object, which has a cylindrical surface and a cylinder longitudinal axis, said method comprising the following method steps: (a) scanning the cylindrical surface of the object at a plurality of scanning locations by means of optical beams; (b) capturing, by means of an optical detector, a location-dependent intensity distribution of the optical beams deflected in the optical object; (c) determining the angles of deflection of the zero-order beams for each scanning location from the captured intensity distribution, comprising eliminating beam intensities, and (d) calculating the index-of-refraction profile of the object on the basis of the angle-of-deflection distribution, wherein method steps (a) and (b) are carried out with light beams having at least two different wavelengths.

13 Claims, 5 Drawing Sheets

(56) References Cited

U.S. PATENT DOCUMENTS

Figure 1:
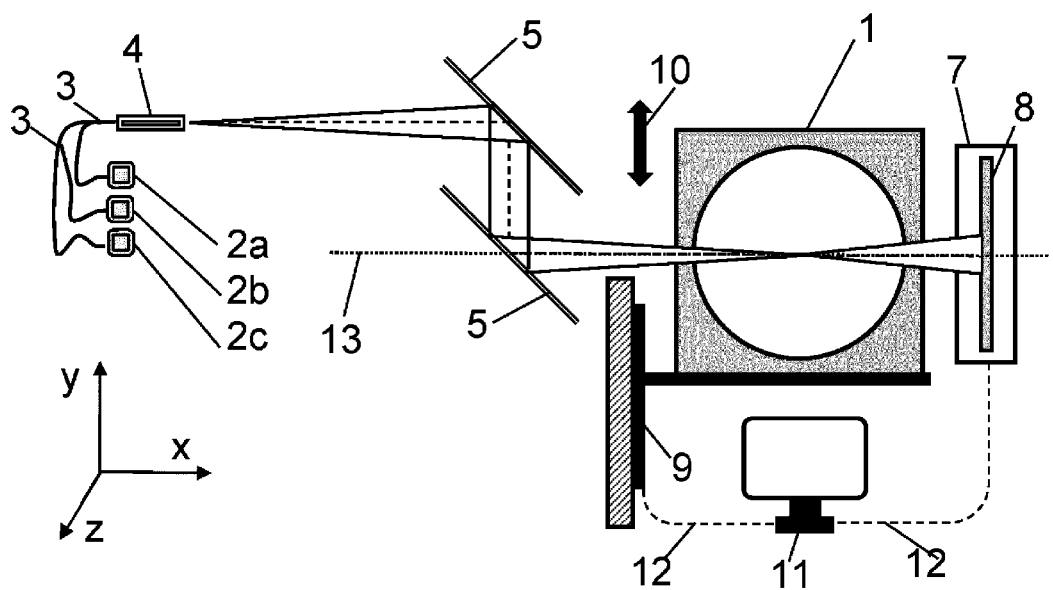

| | | | |
|---|---|---|---|
| 4,515,475 A | 5/1985 | Payne et al. | |
| 4,864,995 A | 9/1989 | Kanno et al. | |
| 5,365,329 A * | 11/1994 | Svendsen | G01N 21/412 356/73.1 |
| 5,396,323 A | 3/1995 | Abbott, III et al. | |
| 6,025,906 A | 2/2000 | Hepburn et al. | |
| 7,212,280 B1 * | 5/2007 | Fardeau | G01N 21/952 356/73.1 |
| 9,989,458 B2 | 6/2018 | Cook et al. | |
| 10,378,996 B2 | 8/2019 | Rasnik | |
| 10,508,973 B2 | 12/2019 | Schmitt et al. | |
| 2008/0277567 A1 * | 11/2008 | Doran | G01N 21/4795 250/227.2 |
| 2009/0122300 A1 * | 5/2009 | Wu | G01N 21/4133 356/128 |
| 2010/0245805 A1 * | 9/2010 | Cook | G01N 21/412 356/128 |
| 2013/0148113 A1 | 6/2013 | Oku et al. | |
| 2016/0123873 A1 * | 5/2016 | Cook | G01M 11/37 356/73.1 |
| 2022/0074854 A1 * | 3/2022 | Suzuki | G02B 21/086 |
| 2022/0107269 A1 * | 4/2022 | Liarommatis | G01N 21/4133 |

FOREIGN PATENT DOCUMENTS

| | | |
|---|---|---|
| DE | 69511595 T2 | 1/2000 |
| EP | 3315948 A1 | 5/2018 |
| EP | 3315948 B1 | 9/2019 |
| JP | H02309228 A | 12/1990 |
| JP | H05178634 A | 7/1993 |
| JP | 2013096899 A | 5/2013 |
| JP | 2015049168 A | 3/2015 |
| WO | 8102634 A1 | 9/1981 |
| WO | 2011121694 A1 | 10/2011 |
| WO | 2016022151 | 2/2016 |

\* cited by examiner

METHOD FOR DETERMINING THE REFRACTIVE-INDEX PROFILE OF A CYLINDRICAL OPTICAL OBJECT

TECHNICAL BACKGROUND

The invention relates to a method for determining an index-of-refraction profile of an optical object which has a cylindrical surface and a longitudinal cylinder axis, comprising the following method steps:

(a) scanning the cylindrical surface of the object at a plurality of scanning locations by means of optical beams which are incident perpendicularly to the cylinder longitudinal axis, (b) capturing, by means of an optical detector, a location-dependent intensity distribution of the optical beams deflected in the optical object, (c) determining the angles of deflection of the zero-order beams ($I_0$) for each scanning location from the intensity distribution (40a, 40b, 40c), comprising eliminating beam intensities of higher-order beams ($I_1$, $I_2$, $I_3$) from the intensity distribution (40a, 40b, 40c) so that an angle-of-deflection distribution for zero-order beams ($I_0$) is obtained, and (d) calculating the index-of-refraction profile of the object (22) on the basis of the angle-of-deflection distribution.

Such cylindrical optical objects are, for example, fiber preforms, optical fibers, optical waveguides, or cylindrical lenses. One of the important properties of such objects is their refractive index (the index of refraction) and its spatial distribution, in particular the radial refractive-index distribution, which is also referred to below as a "refractive-index profile". For example, the refractive-index profile of the fiber preform thus determines the waveguide properties of the optical fiber drawn therefrom.

What are known as preform analyzers are used for the device-assisted analysis of the refractive-index profile. A focused optical beam (hereinafter also referred to as a "light beam") is thereby guided in a grid pattern through a cross-section of the object transverse to the longitudinal cylinder axis of the optical object to be measured, such as a preform for optical fibers, and the angle of deflection of the refracted light beam exiting from the object is measured with respect to the beam direction at the point of incidence. The grid-pattern transillumination of the cross-section at the plurality of scanning locations is referred to here as "scanning". The group of different angles of deflection that are measured perpendicular to the longitudinal cylinder axis upon scanning the light beam is referred to as an "angle-of-deflection distribution". From the transverse measurement data of the angle-of-deflection distribution, the refractive-index profile can be reconstructed in the volume region that is illuminated.

PRIOR ART

Such a method for reconstructing the radial refractive-index profile of a cylindrical optical preform from an angle-of-deflection distribution and the associated point of incidence is known from EP 3 315 948 A1. The measured angle-of-deflection distribution is thereby processed via analysis and determination of extreme values, such as those that occur, for example, at the outer edges of the core or a shell layer of the preform.

An exact determination of the refractive-index profile of an optical object is hindered by refractive index fluctuations on the microscopic scale. Such refractive index fluctuations appear in the form of striae or layers which form in the production of synthetic glass via layer-by-layer deposition of soot particles from the gas phase. Methods for layer-by-layer deposition are known under the names OVD (outside vapor deposition), MCVD (modified chemical vapor deposition), PECVD (plasma enhanced chemical vapor deposition), POD (plasma outside deposition), and VAD (vapor axial deposition).

The layers act as a light-permeable diffraction grating at which the light beam penetrating the object is additionally diffracted. If the layer pitches lie within the order of magnitude of the wavelength of the light beam, the light beam can interact with the layers and split into additional more or less diffracted optical beams of different diffraction orders. Each of these further light beams can in turn experience additional diffraction in the further beam path, which leads to diffraction blurring due to different angles of deflection and exit locations from the optical object. As a result of this beam diffraction, a complex deflection pattern is obtained for each output light beam, which pattern comprises the only refracted but not additionally diffracted primary beam (zero-order beam) and also higher-order beams diffracted by diffraction. The angle of deflection of the diffracted beams relative to that of the undiffracted beam can thereby be small, so that the respective exit locations lie close to one another or overlap. If the beam diffraction effects dominate the angle-of-deflection distribution, the intensity of the higher diffraction modes can even exceed the intensity of the primary diffraction mode. If applicable, it is difficult, if not impossible, to reconstruct the refractive-index profile from the angle-of-deflection distribution, wherein the degree to which the layers impair the analysis of the object depends on pitch and amplitude of the layers.

The beam diffraction effects may be reduced if the measurement wavelength is increased. For this reason, U.S. Pat. No. 5,396,323 A proposes a refractive-index profile analysis technique in which a light beam with a long measurement wavelength of, for example, 3395 nm, i.e. in the infrared spectral range, is used to measure the angle-of-deflection distribution.

From US 2016/123873 A1, a method is known for measuring a refractive-index profile of a cylindrical glass body according to the aforementioned type. The aim is to measure glass bodies with large striae. For this purpose, the cylindrical surface of the glass body is scanned at a plurality of scanning locations using a collimated optical beam originating from an illuminated gap, and the illuminated gap is respectively focused on an imaging plane behind the glass body. The image of the illuminated gap is captured by means of at least one detector, and those exit locations are identified at which the zero-order optical beams are incident after they, starting from scanning locations, have passed the compacted glass body.

In the imaging plane, all optical beams exiting the glass body are at their smallest. By capturing the image of the illuminated gap in the imaging plane, the zero-order beams can be differentiated more easily from the diffracted higher-order beams.

The angles of deflection of the zero-order beams and a corrected angle-of-deflection distribution of the zero-order optical beams are determined from the data pairs of the scanning and exit locations. By means of the Abel transform, the refractive-index profile of the glass body is reconstructed from the corrected angle-of-deflection distribution.

Technical Object

Given the known measuring method, the intensities of higher-order beams captured by means of the camera are eliminated. The elimination comprises a prediction of a beam path of the zero-order beam through the glass body to be measured, for each scanning location. This prediction is based on the scanning location of the incident optical beam on the cylindrical surface, and the location where the zero-order beam is expected to be incident on the optical detector. Based on this, the analysis data for diffracted higher-order beams which have been detected by the detector are rejected.

To identify the exit locations of the zero-order optical beams, two cameras are used, which cameras can simultaneously capture the image of the gap by means of a beam splitter. The positions of the object planes of the cameras are individually set such that the one object plane lies in front of the imaging plane of the illuminated gap and the other object plane lies behind the imaging plane of the illuminated gap. However, since none of the object planes of the cameras is located exactly in the imaging plane, the cameras capture an at least slightly distorted image of the gap.

In order to determine the approximate point of incidence of the zero-order beam in advance, a pre-scan is performed. A reference preform with similar size and similar index-of-refraction profile is thereby measured. The position of the zero-order beam center axis that was found in the pre-scan is used to adjust the center position of the camera recording window, and it is ensured that the center of the zero-order beam is centered approximately in the recording window in which the data is analyzed. An alternative to pre-scanning is to use already existing knowledge about the glass body and the general shape of the angle of deflection function to determine the expected location of the zero-order beam.

For example, a laser diode is used as a beam source. The measurement wavelength of the radiation is in the visible wavelength range or in near infrared (NIR) or in middle infrared (MIR). Compared to NIR radiation, when MIR radiation of, for example, 3.39 µm is used, the diffraction angle of the higher-order beams is increased, so that the intensity signals of the zero-order beam obtain a greater spacing from those of the diffracted higher-order beam, and the adjacent signals are therefore more easily resolved by the camera. On the other hand, the signal-to-noise ratio of thermal detectors for the capturing of MIR radiation is, in principle, worse than that of NIR detectors and detectors for visible light. Finally, the use of MIR radiation is recommended if the periodic layers in the glass body to be measured have a comparatively large spacing of, for example, 14.1 µm, and the use of NIR radiation is recommended if the periodic layers in the glass body to be measured have a comparatively small pitch of, for example, 6.7 µm.

For the prediction of a beam path and for the suitable selection of the measurement wavelength, the known measuring method requires background knowledge about the glass body to be measured or about its production.

The identification of the exit locations of the zero-order optical beams using two cameras is structurally complex and requires a high outlay for adjusting and processing the captured data. The invention is therefore based on the object of specifying a method for determining the refractive-index profile of a cylindrical, transparent object afflicted with periodic layers, said method making do without or with little advance information about the object and its production. Moreover, the object of the invention is to design the determination of the angle-of-deflection distribution to be optimally structurally simple, including identifying the zero-order beam and eliminating the signals from higher-order beams.

SUMMARY OF THE INVENTION

Proceeding from a method of the aforementioned type, this object is achieved according to the invention by method steps (a) and (b) each being carried out with light beams of different wavelengths, wherein a first location-dependent intensity distribution of a first light beam with a first wavelength and at least one further, second location-dependent intensity distribution of a second light beam with a second wavelength are obtained, and wherein the elimination of beam intensities of higher-order beams comprises a comparison of intensities of the first intensity distribution and of the second intensity distribution at the same scanning locations.

The elimination of beam intensities of higher-order beams is especially important at those positions of the intensity distribution at which the intensity profile is ambiguous. This is regularly so, for example, in the case of optical preforms in the region of transitions or jumps in the index of refraction and in the case of production-related layer formation. Here, the angle-of-deflection distribution can show a pronounced pattern and the associated light intensity can show a fanned-out distribution.

In order to reduce this fanning-out and ideally to eliminate it, the optical object to be measured is scanned simultaneously or preferably successively with at least two light beams of different wavelengths in the method according to the invention. Here, a first location-dependent intensity distribution of the first deflected light beam with a first wavelength $\lambda_1$ and at least one further, second intensity distribution of the second deflected light beam with a second wavelength $\lambda_2$ are obtained. The two intensity distributions differ from one another in particular in the position of the intensity maxima for the higher-order beams, whereas the intensity maximum for the zero-order beam is substantially the same in the intensity distributions. The reason for this is the wavelength dependence of the above-described beam diffraction effect. The diffraction at the microscopic refractive index fluctuations is different at the first measurement wavelength than at the second measurement wavelength, in contrast to which the refraction of the light beam in the object is virtually independent of the wavelength. By comparing the beam intensities, measured at the same radial position (in relation to the preform), of the first and second light beams, intensities of higher-order beams can be identified as such on the basis of their displacement relative to one another and eliminated. And vice versa, by comparing the beam intensities, measured at the same radial position (in relation to the preform), of the first and second light beams, the intensities of the zero-order beam can be identified in that they do not have a displacement relative to one another.

Advance information about the internal structure of the optical object to be measured, and in particular knowledge about the periodicity of the layers or a prediction of a beam path and complex ray-tracing methods are not required for identifying and eliminating the beam intensities of higher-order beams.

In a preferred procedure, same-location intensity values of the first and second intensity distributions are mathematically processed with each other in order to eliminate beam intensities of higher-order beams.

The mathematical processing of same-location intensity values (which are the intensity values measured at the same scanning location) is part of optical image processing, for example. It comprises one or more mathematical operations with the aim of masking beam intensities of higher-order beams. The mathematical operation preferably comprises the processing of the intersection sets of same-location intensities, in particular at least one multiplication and/or at least one addition of the same-location intensities of the first and second (and possibly further) intensity distributions. By multiplication, the product of the same-location intensity values is thus essentially the product of the intersection set, which can be very small if at least one of the factors is very small. Adding them together yields the sum of the same-location intensity values, i.e. essentially the union, which can likewise be relatively small if both summands are small or at least one of the summands is small.

The result of the mathematical processing is a prepared intensity distribution with comparatively small intensity values in the region with a noteworthy relative displacement in the same-location beam intensities and with high intensity values in the region without or with at most slight displacement, i.e., in the region of the locally stable angles of deflection of the zero-order beam. In order to further improve the detection accuracy of the zero-order beam, the elimination of beam intensities of higher-order beams can comprise a measure in which intensities of the first, of the at least one further, second, and/or of a prepared intensity distribution which fall below an intensity threshold are entirely or partially eliminated.

A prepared intensity distribution is obtained, for example, by the same-location intensities of the first and second intensity distributions being subjected to a mathematical operation as described above. Intensity signals with low level are mathematically suppressed or removed via the intensity threshold filter. Preferably, all intensity values below the threshold are discarded before the angle of deflection of the zero-order beam is determined.

The intensity threshold is thereby preferably set to a value that is less than 20%, preferably less than 15%, of a maximum intensity value of the light intensity profile.

Given high fixed thresholds, for example above 20% of the maximum value, important information is possibly lost. Therefore, in principle, constant thresholds are only to be selected as high as required.

The comparison of intensities of the first and second intensity distributions at the same scanning locations for eliminating beam intensities of higher-order beams preferably comprises computer-aided image processing.

In a particularly preferred method variant, a line scan camera with only one light-sensitive line sensor is used as an optical detector for capturing the beam intensity distribution according to method step (b).

In comparison with an area sensor, the data set generated by a line sensor with the same resolution is significantly smaller and can be read out and processed more quickly.

The line sensor advantageously has a length that is sufficient to capture the entire angle-of-deflection distribution of the object in a single scanning process. Line sensors with a length of at least 40 mm, preferably at least 60 mm, have proven successful for this purpose.

The longer the sensor line, the greater the angles of deflection that can be imaged, i.e. the larger the refractive index jumps in the index-of-refraction profile that can be captured. Line sensors with a length of more than approximately 80 mm are generally not required, since a reduced mapping to the line sensor can also be realized by means of a lens in front of the line scan camera, albeit at the cost of reduced resolution.

The data set to be processed is kept particularly small if a color resolution is dispensed with and—as given the method preferred here—a monochromatic line sensor is used.

The data set to be processed will be further reduced if the line sensor is operated at a low color depth, such as a bit depth of 8 bits. In the case of a low data volume, the 8-bit depth enables a resolution of 256 brightness values, which is sufficient for the present application.

As a rule a focused optical beam is used to scan the surface of the optical object. Focusing typically takes place by means of convex lenses. However, the focal position thereby depends on the wavelength of the measurement radiation. Since different measurement wavelengths are used in the method, compensation measures must be taken upon focusing by means of a convex lens in order to achieve a constant focal position. Alternatively and preferably, for scanning the cylindrical surface according to method step (a), the optical beam is focused by means of a parabolic mirror.

A parabolic mirror, particularly preferably what is known as an off-axis parabolic mirror, enables a dispersion-independent focusing of the optical beams of different wavelengths.

In a preferred procedure, method steps (a) and (b) are performed with radiation of a first wavelength and at least one second wavelength, wherein the first wavelength and the second wavelength differ from one another by at least 50 nm and by at most 400 nm, and preferably by at least 80 nm and by at most 300 nm.

In another preferred method variant, method steps (a) and (b) are performed with radiation of the first wavelength, the second wavelength, and a third wavelength, wherein the third wavelength is longer than the first and shorter than the second wavelength, and the third wavelength differs from the first wavelength and the second wavelength by at least 50 nm and by at most 400 nm, and preferably by at least 80 nm and by at most 300 nm.

Given use of three different wavelengths, the practical advantage is that color images are conventionally stored and especially also processed with three color channels. Therefore, traditional methods of image processing can be applied to evaluate the intensity signals.

The greater the wavelength difference of adjacent wavelengths, the more pronounced the relative displacement of the angles of deflection, or of the beam intensities, of the beams of the same higher order. On the other hand, it is advantageous if one and the same detector can be used for both, or for all, measurement wavelengths, which can be technically realized most simply by comparatively small wavelength differences.

Method steps (a) and (b) are preferably carried out in series with radiation of the first wavelength and subsequently with radiation of the second and further wavelength.

The terms "first" and "second" wavelength thereby signify nothing regarding which of the wavelengths is the shorter or the longer. The serial processing facilitates the evaluation of the intensity data via serial mathematical calculation.

A procedure has proven successful in which the different wavelengths lie in the wavelength range from 400 to 1600 nm, and preferably below 1100 nm.

For measurement wavelengths in the visible wavelength range and in the near infrared range up to a maximum of 1600 nm, preferably a maximum of 1100 nm, a sufficiently good signal-to-noise ratio results and light sources and detectors are available. By definition, the near infrared wavelength range begins at approximately 780 nm.

On the one hand, a minimum distance between adjacent measurement wavelengths is required so that the relative displacement of the angles of deflection, or of the associated beam intensities, of the same higher order, for example of the respective first order, and thus the splitting of the corresponding beam intensities, becomes visible. However, the assignment of an angle of deflection, or of associated beam intensities, to a particular measurement wavelength can be hindered if the angle of deflection of a higher order of the one measurement wavelength approximately coincides with the angle of deflection of another higher order of the other measurement wavelength. Such an "approximate coincidence" may result, for example, if the measurement wavelengths in question have approximately the same lowest common multiple. A wavelength difference of less than 40 nm is herewith defined as "approximately equal". The risk of such an "approximate coincidence" of diffracted beams of different higher orders (up to a maximum of third order) is reduced if at least one of the measurement wavelengths is selected from a wavelength range that is close to the upper limit of the spectral sensitivity of the detector. Such conditions are regularly fulfilled for measurement wavelengths in the visible wavelength range and in the near infrared range up to a maximum of 1600 nm, preferably a maximum of 1100 nm, and given a spectral sensitivity of the detector in this wavelength range. In a preferred exemplary embodiment, the different wavelengths are selected from the wavelength ranges: 635±50 nm, 840±50 nm, 970±50 nm, 1040±50 nm, and 1550±50 nm.

It has also proven advantageous if the beams are focused on a point in the optical object during the scanning of the cylindrical surface of the object. When focusing on a point in the volume of the cylindrical object, for example on the cylinder longitudinal axis, sharp transitions in the form of refractive-index jumps can be better imaged and evaluated than when focusing outside the volume.

Definitions

Individual method steps and terms of the above description are additionally defined below. The definitions form part of the description of the invention. That which is expressed in the description is definitive in the event of a factual contradiction between one of the following definitions and the remaining description.

Optical Beams

The optical beams incident on the cylinder surface of the object to be measured during scanning result, for example, from the displacement of a light beam, such as a laser beam.

Angle-of-Deflection Distribution ψ(y) The angle of deflection is defined as the angle between the exit beam exiting the object to be measured and the entry beam entering the optical object to be measured. The group of angles of deflection measured during the scanning of the object as a result of the shift, perpendicular to the cylinder longitudinal axis (in the y-direction), of the light beam results in the "angle-of-deflection distribution ψ(y)".

Beam Intensity Distribution

The angle-of-deflection distribution can be represented as a local distribution of the beam intensity which the optical detector captures during the scanning of the optical object to be measured. In this respect, the beam intensity distribution measured during the scanning represents the angle-of-deflection distribution. The beam intensity distribution can be fanned out as a result of diffraction effects and formation of diffracted higher-order beams in one or more regions.

This fanning-out is to be assigned to a particular radial position of the preform, and it comes about when the detector at one and the same measurement position simultaneously captures beam intensities at a plurality of points of its optical sensor.

EXEMPLARY EMBODIMENT

The invention is explained in more detail below with reference to an exemplary embodiment and a drawing. The drawing shows, in detail FIG. 1: a schematic representation of an embodiment of a measuring system for measuring an angle-of-deflection distribution, FIG. 2: a diagram for explaining the implementation of the measurement, FIG. 3: beam intensity distributions, measured on a preform with core and shell produced by an OVD process, for three different measurement wavelengths, FIG. 4: details of the beam intensity distributions of FIG. 3 in an enlarged representation, and FIG. 5: a diagram with original light profiles, which are obtained by excitation of pixels of a line scan camera at one and the same measurement position ((a) and (b)), and for computational processing ((c) and (d)) of the original light profiles for the purpose of eliminating the portion of diffracted radiation, FIG. 6: a diagram with a comparison of the determined refractive-index distributions given an evaluation by means of a method according to the prior art and the method according to the invention, in which disruptive higher-order diffractions in the raw data are identified and eliminated.

The method serves to determine a refractive-index profile of a cylindrical optical object, in the exemplary embodiment of an optical preform produced by means of an OVD method for drawing optical fibers, which has a pronounced layer structure over a partial region of its volume.

A cross-section of the preform is transilluminated (scanned) in a grid pattern by a light beam, and the angle of deflection can be calculated from the respective point of incidence of the light beam on the cylinder shell surface of the preform and the point of incidence of the light beam on an optical sensor. The group of angles of deflection of the light beams of a scan form the angle-of-deflection distribution, from which the refractive-index profile of the preform is reconstructed. The angle-of-deflection distribution is measured by means of a constructively modified commercial preform analyzer P-106 from York Technology Ltd. FIG. 1 schematically shows the optical structure. The analyzer has a cylindrical measuring cell 1 for receiving the cross-section of the preform to be measured and an immersion liquid surrounding the preform. The light source provided at the factory is replaced by three laser diodes 2a, 2b, 2c with respective specific emission wavelengths of 842 nm (2a), 977 nm (2b), and 1080 nm (2c). These measurement wavelengths are selected such that, within the limits of the spectral sensitivity of the line scan camera 7, an "approximate coincidence" of diffracted beams of different higher orders is excluded.

The laser diodes 2a, 2b, 2c with the different emission wavelengths are connected via two Y-fiber bundles 3 to a beam input component 4, which forms a structural unit with a beam conditioning optics 5. The beam conditioning optics substantially serves for the dispersion-independent focusing of the measuring beams of different wavelengths on one and the same focal point. It consists substantially of two of what are known as off-axis parabolic mirrors 5, and is configured such that the beam focus of the light beam is located in the y-z plane and in the longitudinal cylinder axis of the measuring cell 1. The light beam exiting the preform strikes a line scan camera 7 with a line sensor 8. The direction of extension of the line sensor 8 is the y-direction, as indicated by the Cartesian coordinate cross. The center of the line scan camera 7 is ideally located on the optical axis 13. It is thereby achieved that the greatest possible angles of deflection in the angle-of-deflection distributions can also still be completely resolved.

The line scan camera 7 is a CMOS line scan camera with a monochromatic sensor, which is commercially available under the name UNIIQA+ 16K CL MONOCHROME from Teledyne e2V. It has a sensor length of 82 mm and a horizontal resolution of 16384 pixels at a pixel size of 5 µm and a color depth (brightness resolution) of 12 bits, but only 8 bits are used. The line scan camera has a sufficient spectral sensitivity in the wavelength range from 400 nm to approximately 1100 nm.

The light beams deflected in the y-direction are detected by the line sensor 8 of the line scan camera 7, wherein the necessary data set to be processed for this purpose remains manageably small despite its large extent with the sensor length of 82 mm (smaller by a factor of some 1000s than when using an area scan camera). As a result of this sensor length, possible optics behind the measuring cell 1 can be dispensed with, even given relatively large refractive index jumps of the preform to be resolved. The line scan camera 7 reduces the extent of the measurement data to be evaluated to the essentials, whereby significant improvements in performance result. The evaluation is described in more detail below using FIGS. 3 to 6.

The position of the measuring cell 1 can be changed with respect to the optical axis 13. For this purpose, the measuring cell 1 is mounted on a displacement table 9 and can, by means of this, be displaced perpendicular to the optical axis 13 in the direction (y-direction) indicated by the directional arrow 10. The displacement table 9 and the line scan camera 7 are connected to a computer 11 via data lines 12.

Figure 2:
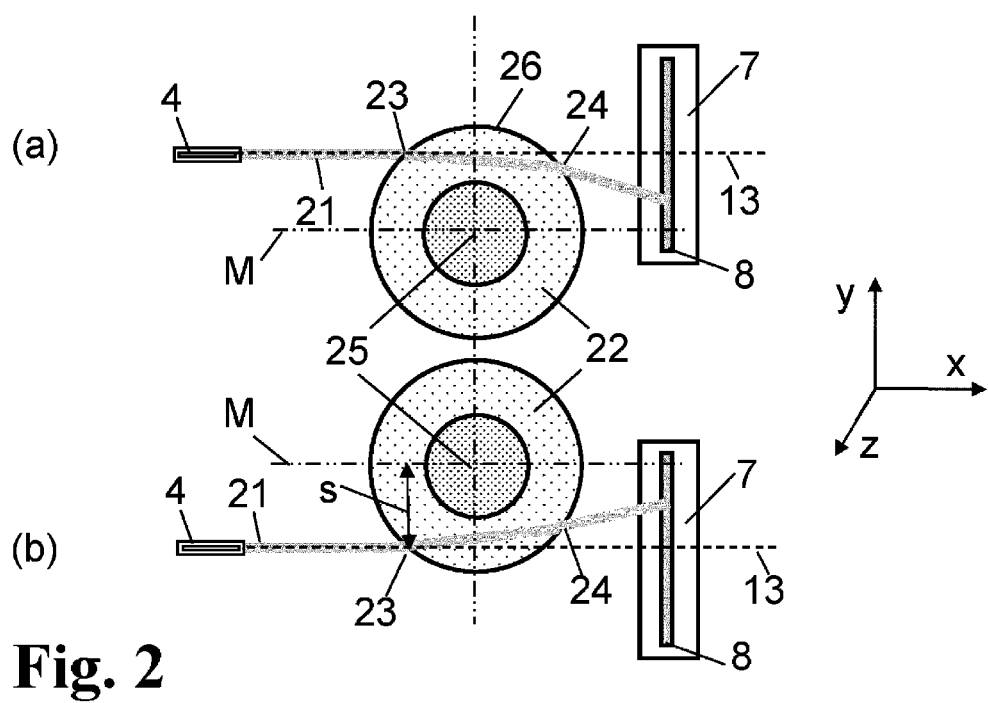

FIG. 2 schematically shows the beam path of the light beam 21 with the preform 22 inserted into the measuring cell 1 (FIG. 1), at an upper scanning position (a) and a lower scanning position (b). The light beam 21 entering the beam input component 4 strikes the cylindrical surface 26 and is refracted at the entry location 23 into the preform 22 in the direction of the preform central axis 25. Upon exiting at the exit location 24, the light beam 21 is refracted again and arrives at the line sensor 8 of the line scan camera 7. In this case, the light-sensitive pixels of the line sensor 8 capture a single beam intensity at one and the same scanning location 23, such as the scanning location 23 at a distance s from the center line M (FIG. 2b), wherein one pixel or a few adjacent pixels are being excited. Or they capture a plurality of beam intensities at different points of the line sensor 8, wherein a plurality of pixels spaced apart from one another are being excited. The latter takes place, for example, in the case of a light beam which, apart from the zero-order light mode, is additionally transporting one or more higher orders. The excited pixels mark a beam intensity of the deflected light beam 14, which beam intensity is distributed over the length of the line sensor 8 and is also referred to below as "luminous pixel profile". The line sensor 8 and the luminous pixel profile extend in the y-direction (in the coordinate system of FIG. 2). In the following explanations regarding the luminous pixel profile, the designation $y_{pixel}$," is also used for its direction of extension.

By means of a grid-pattern shift of the preform 22 perpendicular to the optical axis 13, the point of incidence of the light beam shifts along the preform 22 until the cross-sectional area thereof is fully transilluminated. In each shift position, the line sensor 8 of the line scan camera 7 captures a new luminous pixel profile, which is in each case formed by the deflected, non-diffracted zero-order beam and any deflected and diffracted higher-order beams. The preform 22 is likewise shifted in the y-direction (in the coordinate system of FIG. 2). For differentiation from the direction of extension "$y_{pixel}$," the direction of shift is also referred to as "$y_{shift}$".

In general, angle-of-deflection distributions $\psi(y)$ are shown in a two-dimensional intensity distribution diagram in which the luminous pixel profile is plotted on the one axis in the direction $y_{pixel}$ and the shift position is plotted on another axis along $y_{shift}$. The two-dimensional beam intensity distribution, which represents the one-dimensional angle-of-deflection distribution $\psi(y)$ of the preform 22 as a whole, results in this representation by concatenating all captured luminous pixel profiles along $y_{shift}$.

Figure 3:
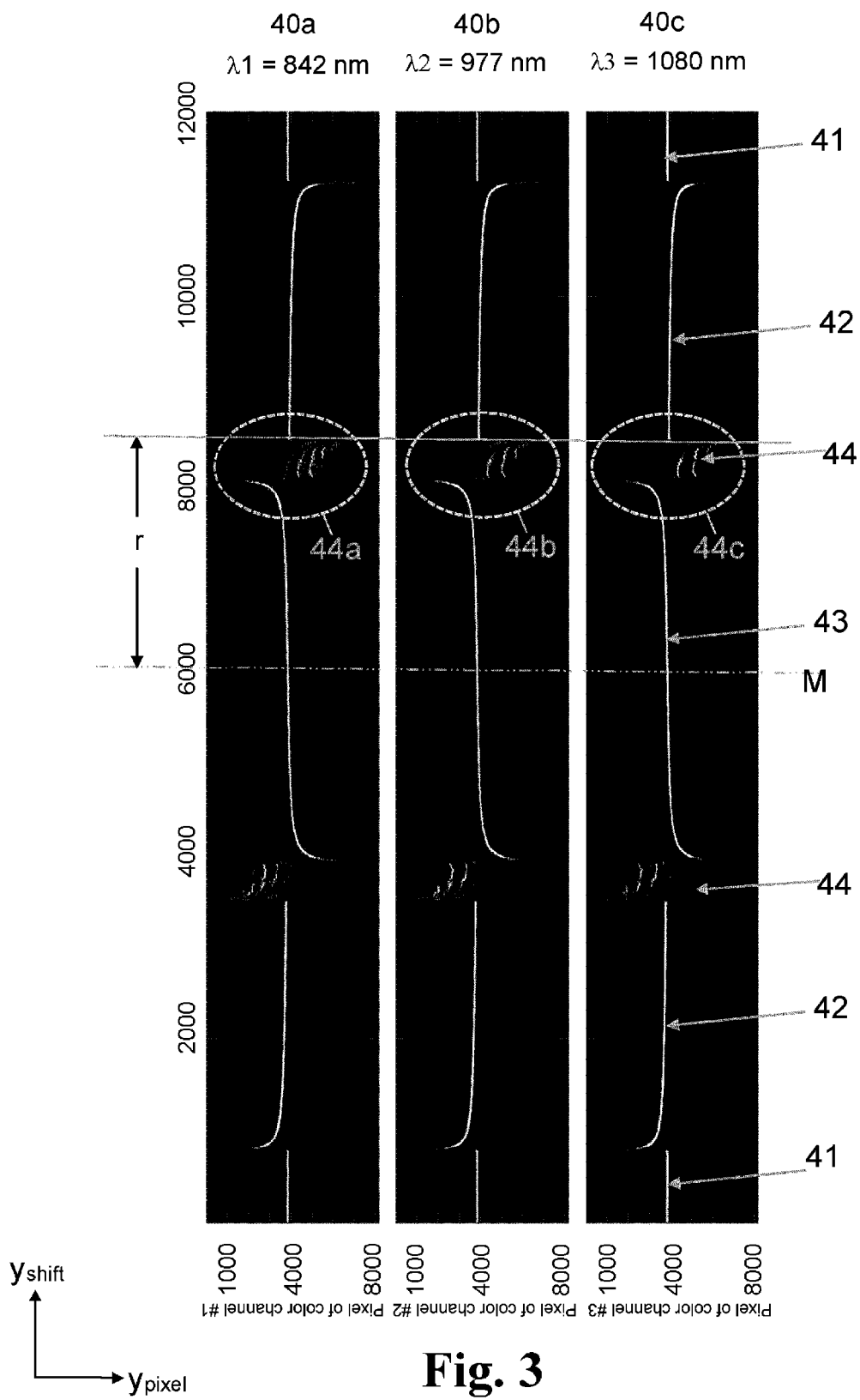

FIG. 3, for example, shows three of these diagrams. The beam intensity distributions 40a, 40b, 40c are angle-of-deflection distributions that include both the intensity signals of the zero-order beams and the intensity signals of higher-order beams.

These beam intensity distributions are evaluated with the aim of identifying the intensity profile of the zero-order beam and eliminating for this purpose the signals that are attributable to higher-order beams. For this purpose, the same preform cross-section is scanned successively with the light beam of all laser diodes 2a, 2b, 2c and their specific different emission wavelengths. This results in three original beam intensity distributions recorded by the line scan camera 8 and stored by the computer 11.

The three angle-of-deflection distributions of FIG. 3 in each case show, for one of the above-mentioned measurement wavelengths (diodes 2a, 2b, 2c), the beam intensity distribution 40a, 40b, 40c captured by the line scan camera 7. The beam intensity distributions 40a, 40b, 40c are in general contained in a single common recording; however, for reasons of illustration, a separate recording is shown here for each of the color channels. The two-dimensional beam intensity distributions 40a, 40b, 40c each comprise 8000 pixels in the horizontal direction ($y_{pixel}$) and 12000 pixels in the vertical direction ($y_{shift}$). They simultaneously form angle-of-deflection distributions $\psi(y)$; the latter are largely inversely mirror-symmetrical about the center line M. Each of the angle-of-deflection distributions $\psi(y)$ shows edge regions which are in each case assigned to the measuring cell material 41 or the immersion oil 42. The central core region 43 of the preform 22 consists of undoped quartz glass and is surrounded by a shell 44 made of a quartz glass doped with fluorine. The radius of the preform 22 is denoted by the block arrow "r". Within the "r" section, each angle of deflection or each beam intensity value is to be assigned to a particular point of incidence of the light beam on the preform surface and to a particular radial position of the measured preform.

In the region of the shell 44, the beam intensity distributions 40a, 40b, 40c show regions 44a, 44b, 44c marked by a frame, which regions have a markedly structured and broadly fanned-out light intensity distribution in the direction $y_{pixel}$ and which do not allow a clear and unique identification of the angle-of-deflection distribution in this region. The fanning-out of the light intensity distribution in the shell region results from diffraction of the respective light beam 21 at the layer structure of the preform 22. The "luminous pixel profiles" captured in these regions by the line sensor 8 show not only a single beam intensity (as is, for example, the case in the core region 43) but rather a plurality of beam intensities spaced apart from one another. This is explained in more detail below by reference to FIGS. 4 and 5.

Figure 4:
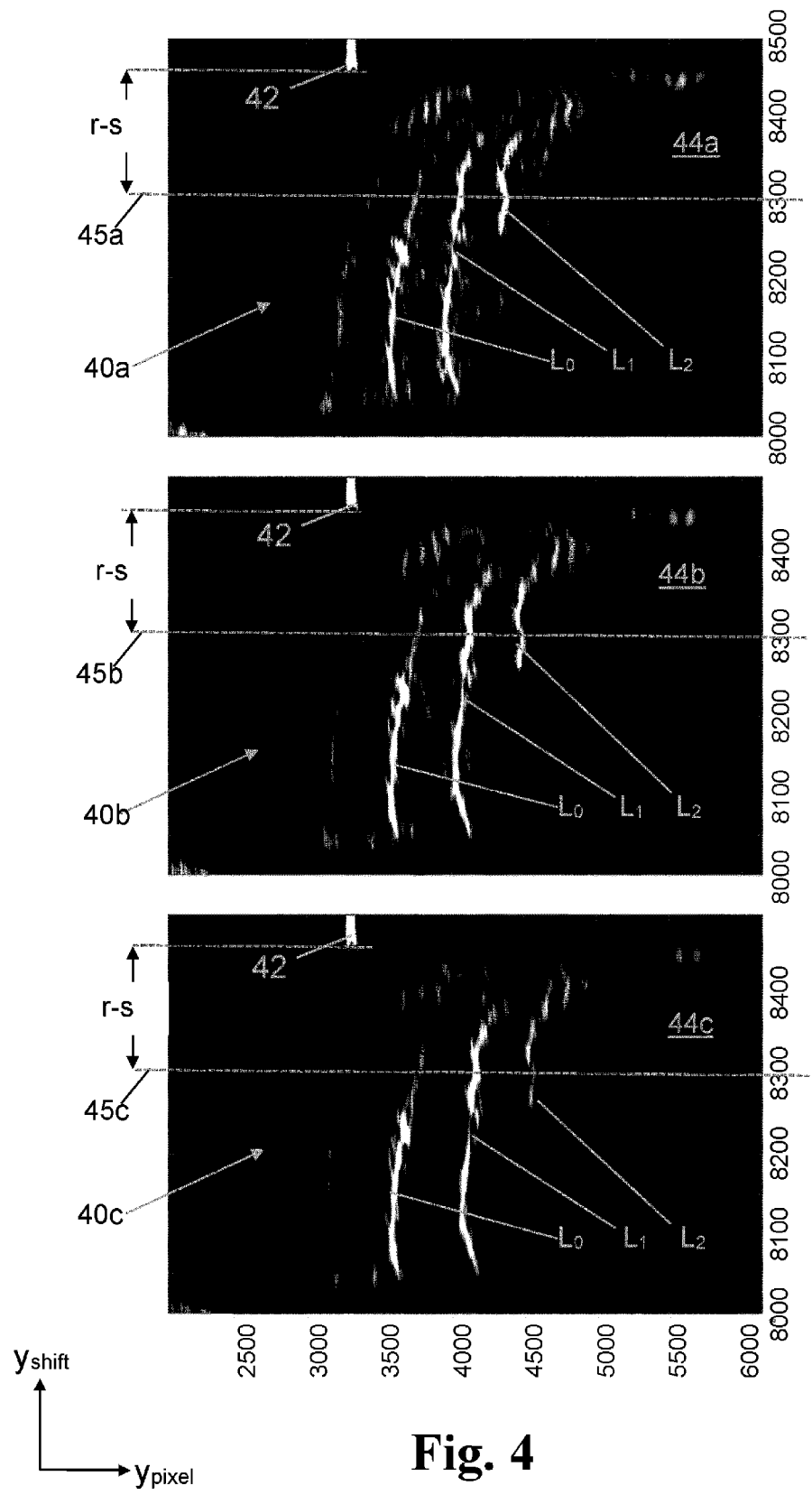
Figure 5:
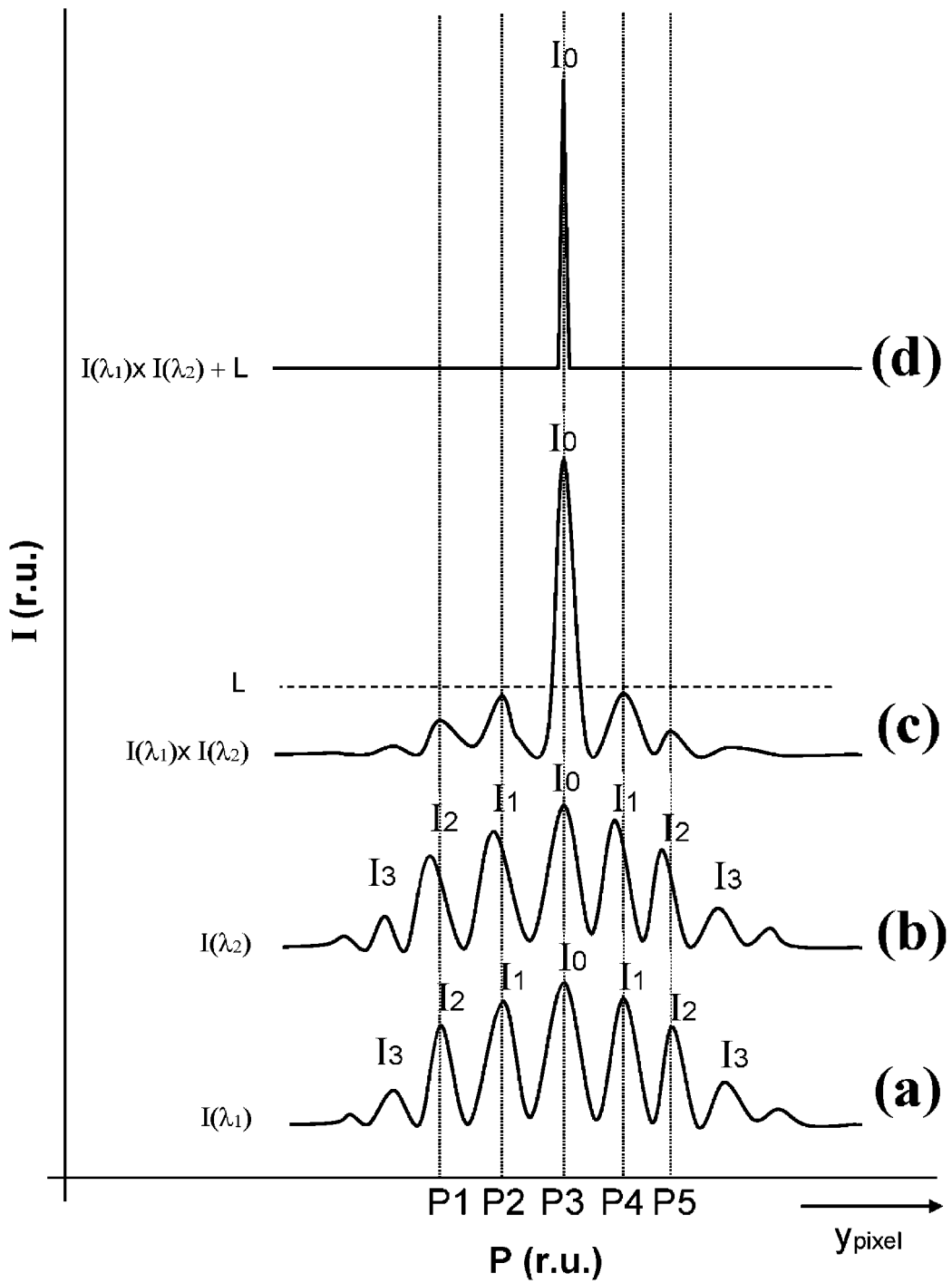

The enlargement, shown in FIG. 4, of the regions 44a, 44b, 44c includes the $y_{pixel}$ number range of approximately 2500 to 6000 and the $y_{shift}$ number range of 8000 to 8500, which is to be assigned to the shell region 44. The recordings in each case show a plurality of light intensity lines $L_0$, $L_1$; $L_2$, which are assigned to the zero-order beam and diffracted higher-order beams at the respective measurement wavelength. Upon closer inspection, it can be seen that the distance between the light intensity lines $L_0$, $L_1$, $L_2$ increases from region 44a, via 44b, to region 44c. This proves the wavelength dependency of such spacing or, respectively, the wavelength dependency of the positions of the angle-of-deflection distributions of the higher-order beams. In contrast thereto, the position of the zero-order beam is to be found independently of the measurement wavelength at one and the same position. In the exemplary embodiment, this is the light intensity line $L_0$, which in all recordings is in the vertical pixel number range around 3600. It is noticeable here that the light intensity line $L_0$ is not in the middle of the appearing diffraction orders. The cause of this is that the optical grating at which the beams are diffracted (i.e., the striae structure or layer structure of the preform) is not ideal but rather curved and aperiodic. In the region 44a, a horizontal auxiliary line 45a is drawn in at the radial position r-s (pixel number 8300; with r=preform radius and s=distance between the scanning location 23 and the preform center line M), and further horizontal auxiliary lines 45b and 45c are drawn in through the regions 44b and 44c, respectively, at the same radial position r-s (pixel number 8300). The auxiliary lines 45a, 45b, 45c run in the direction $y_{pixel}$ and each cross a plurality of light intensity lines $L_0$, $L_1$; $L_2$. The light intensity profile measurable along the auxiliary lines 45a, 45b, 45c is referred to here as the "luminous pixel profile".

The positional independence of the angle-of-deflection distribution 4(y) for the zero-order beam, or more precisely, the positional independence of the light intensity line $L_0$, enables the identification, masking, and elimination of the other light intensity lines $L_1$ and $L_2$ (and any others), as described below. The diagrams of FIGS. 5(a), 5(b) schematically show in each case a luminous pixel profile ($I(\lambda_1)$; $I(\lambda_2)$) for the specific measurement wavelengths ($\lambda_1$; $\lambda_2$). The integrated light intensity I (in relative unit) is plotted against the location coordinate P, which represents the pixel sequence of the line sensor in the direction $y_{pixel}$. The luminous pixel profile $I(\lambda_1)$ could have been measured, for example, along the auxiliary line 45a (FIG. 4), and the luminous pixel profile $I(\lambda_2)$ could have been measured, for example, along the auxiliary line 45b. The two luminous pixel profiles ($I(\lambda_1)$; $I(\lambda_2)$) are formed at the same radial position s (FIG. 2b) of the line sensor 8 and in this respect belong to "same-location" beam intensity distributions. They differ from one another substantially in the position of the intensity signals $I_1$, $I_2$; $I_3$ for the diffracted higher-order beams. The positions P1 to P5 of intensity maxima of diffracted higher-order beams are displaced relative to one another, whereas the intensity signal $I_0$ for the only refracted zero-order beam is substantially at the same position in the intensity distributions, at position P3 in the example.

FIG. 5(c) schematically shows a prepared luminous pixel profile ($I(\lambda_1) \times I(\lambda_2)$), which is obtained by same-location intensity values of the first luminous pixel profile $I(\lambda_1)$ and of the second luminous pixel profile $I(\lambda_2)$ being subjected to a mathematical operation. The latter comprises a multiplication of the same-location intensity values of the first and second luminous pixel profiles ($I(\lambda_1)$; $I(\lambda_2)$). The multiplication results in the product of the intersection set of the same-location intensity values, which in the exemplary embodiment is particularly high for the two already originally comparatively high intensity signals $I_0$, and comparatively small for the intensity signals $I_1$, $I_2$; $I_3$. The prepared luminous pixel profile ($I(\lambda_1) \times I(\lambda_2)$) obtained after the first mathematical processing step has comparatively small intensity values in the region with appreciable relative displacement in the angles of deflection and comparatively high intensity values in the region with no or at most little displacement, i.e., in the region of spatially stable angles of deflection of the zero-order beam.

In order to further improve the detection accuracy of the zero-order beam, the prepared luminous pixel profile ($I(\lambda_1) \times I(\lambda_2)$) is subjected in a second mathematical processing step to an intensity threshold filter, in which intensity signals below a level L, which is defined at 10% of the maximum value of the prepared luminous pixel profile ($\lambda_1(P)$, $\lambda_2(P)$), are computationally removed.

FIG. 5(d) schematically shows the luminous pixel profile ($I(\lambda_1) \times I(\lambda_2) + L$) after this mathematical operation has been carried out. There is only a single peak left, on the basis of which the position of the angles of deflection of the zero-order beam is determined and defined. In the luminous pixel profile ($I(\lambda_1) \times I(\lambda_2) + L$) obtained after this preparation, the originally measured luminous pixel profiles, which are broadly fanned out on the layer structure of the preform 22 due to diffraction of the light beam 21, are replaced by a clear and unique signal which only reflects the angle of deflection of the zero-order beam at the radial measurement position s.

Figure 6:
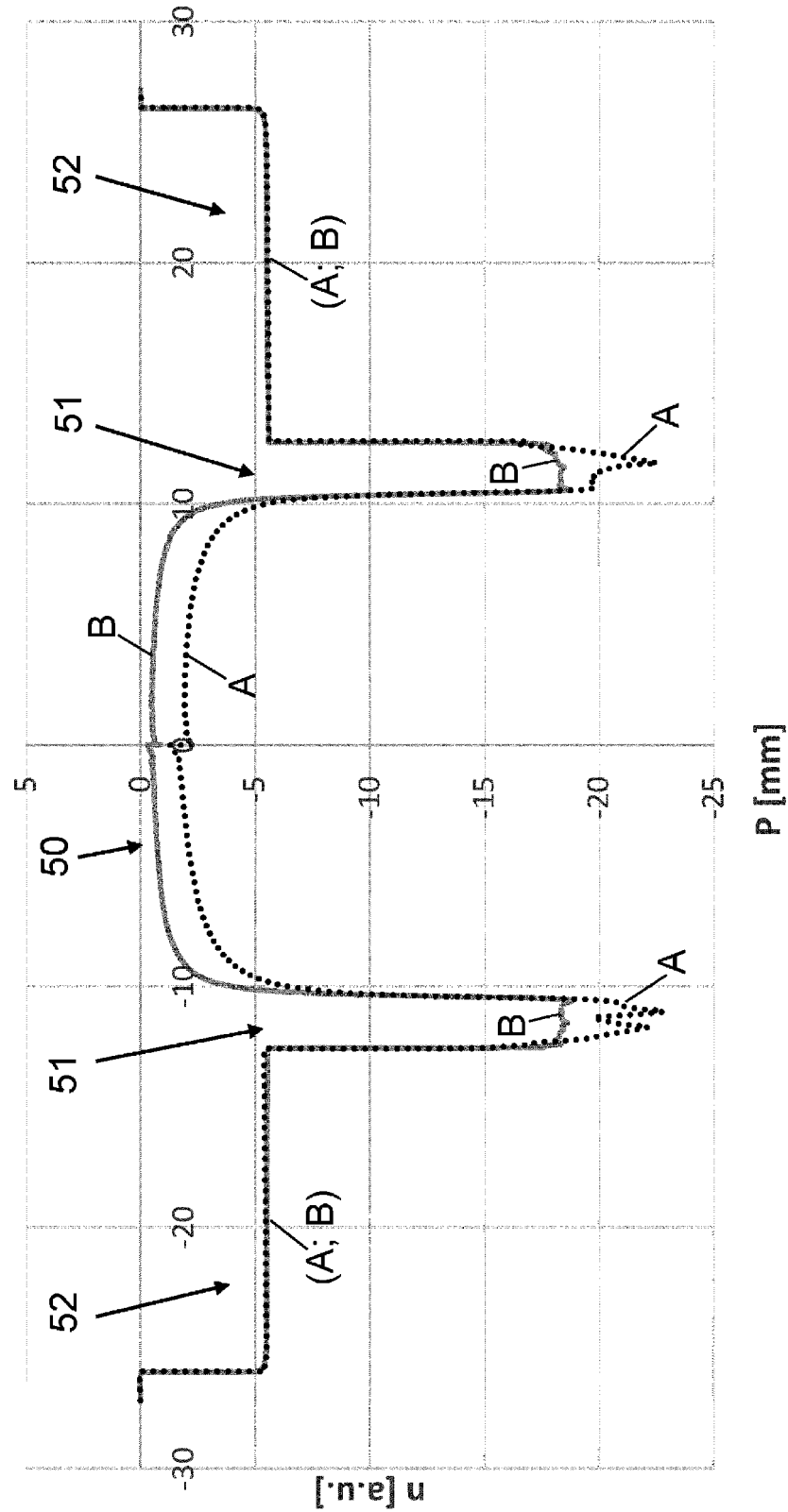

After corresponding processing of the beam intensity distributions 40a, 40b, 40c at all radial positions (s), or at those radial positions where this preparation is required, a prepared beam intensity distribution or angle-of-deflection distribution ψ is obtained with a unique intensity profile for the zero-order beam. The radial refractive-index profile of the preform is determined therefrom using the known inverse Abel transform. An example of this is shown in the diagram of FIG. 6, in which the refractive index n (in comparison to undoped quartz glass, in relative units) is plotted against the radial position P (in mm). The measured preform comprises a core region 50, an inner shell region 51, and an outer shell region 52, wherein the shell regions differ in their index of refraction. The diagram contains two curves. The curve A shows a refractive-index profile determined using the prior art and the curve B shows A refractive-index profile that has been determined using the invention. Thereby, the preform was scanned with the measurement wavelengths of 842 nm, 977 nm and 1080 nm and the intensity distributions obtained afterwards were revised using the first mathematical processing step described above (multiplication of the same-location intensity values) and the second mathematical processing step (intensity threshold filter at 10% of the maximum intensity). The refractive-index profile of the preform, as reflected in curve B and as obtained after method step (d) of claim 1, offers a good basis for the further preparation of the refractive-index distribution using conventional methods, for example the method described in EP 3 315 948 A1. In this method, the refractive-index profile serves to define orientation values, such as an orientation value for a layer radius of the preform or an orientation value for the index of refraction of the layer. In contrast, with the refractive-index profile of curve A, the refractive indices in the inner shell region 51 and in the core region 50 are too low and the step index profile is not clearly pronounced. It turns out that distortions occur, which can also displace and deform the core level due to the underlying mathematics.

In the case of non-radially symmetric refractive-index distributions, the conversion from the measured angle-of-deflection distribution is advantageously performed not by means of the inverse Abel transform but rather by means of what is known as an inverse Radon transform. The processing of the angle-of-deflection distribution thereby takes place as described above using the example. However, a plurality of angle-of-deflection distributions is determined in that the preform is rotated about its longitudinal axis. The respective angle-of-deflection distributions are combined and converted into a phase difference diagram, what is known as the sinogram. The application of the inverse Radon transform to the latter yields a 2D refractive-index distribution.

The invention claimed is:

1. A method for determining an index-of-refraction profile of an optical object, which has a cylindrical surface and a cylinder longitudinal axis, comprising the following method steps:
   (a) scanning the cylindrical surface of the object at a plurality of scanning locations by means of optical beams which are incident perpendicularly to the cylinder longitudinal axis;
   (b) capturing, by means of an optical detector, a location-dependent beam intensity distribution of the optical beams deflected in the optical object;
   (c) determining the angles of deflection of the zero-order beams for each scanning location from the intensity distribution, comprising eliminating beam intensities of higher-order beams from the intensity distribution so that an angle-of-deflection distribution is obtained for the zero-order beams and;
   (d) calculating the index-of-refraction profile of the object on the basis of the angle-of-deflection distribution,
   wherein method steps (a) and (b) are each carried out with light beams of different wavelengths, wherein a first location-dependent intensity distribution of a first light beam having a first wavelength and at least one further, second location-dependent intensity distribution of a second light beam having a second wavelength are obtained, and wherein the elimination of beam intensities of higher-order beams comprises a comparison of beam intensities of the first intensity distribution and of the second intensity distribution at the same scanning locations characterized in that for scanning the cylindrical surface according to method step (a), laser diodes with different emission wavelengths are combined via Y-fiber bundles to an optical beam, and wherein the optical beam is focused by means of a parabolic mirror.

2. The method according to claim 1, wherein, in order to eliminate beam intensities of higher-order beams same-location intensities of the first and second intensity distributions are mathematically processed with each other.

3. The method according to claim 2, wherein the mathematical processing comprises processing of the intersection sets of same-location intensities, and at least one multiplication or at least one addition of the same-location intensities of the first and second intensity distributions.

4. The method according to claim 2, wherein the elimination of beam intensities of higher-order beams comprises a measure in which intensities of the first and/or of the second intensity distribution which fall below an intensity threshold are completely or partially eliminated.

5. The method according to claim 4, wherein the intensity threshold is set to a value that is less than 20% of a maximum intensity value of the intensity distribution.

6. The method according to claim 2, wherein the elimination of beam intensities of higher-order beams comprises computer-aided image processing.

7. The method according to claim 1, wherein a line scan camera with only one light-sensitive line sensor is used as an optical detector for capturing the intensity distribution according to method step (b).

8. The method according to claim 7, wherein a monochromatic line sensor that has a length of at least 40mm is operated at a bit depth of 8 bits is used as the light-sensitive line sensor.

9. The method according to claim 1, wherein method steps (a) and (b) are carried out with radiation of a first wavelength and of at least one second wavelength, wherein the first wavelength and the second wavelength differ from one another by at least 50 nm and by at most 400 nm.

10. The method according to claim 9, wherein method steps (a) and (b) are carried out with radiation of the first wavelength and subsequently with radiation of the second wavelength.

11. The method according to claim 9, wherein method steps (a) and (b) are carried out with radiation of the first wavelength, of the second wavelength, and of a third wavelength, wherein the third wavelength is longer than the first wavelength and shorter than the second wavelength, and the third wavelength differs from the first wavelength and from the second wavelength by at least 50 nm and by at most 400 nm.

12. The method according to claim 1, wherein the different wavelengths are in the wavelength range of 400 to 1600 nm.

13. The method according to claim 1, wherein the different wavelengths are selected from the wavelength ranges: 635±50 nm, 840±50 nm, 970+50 nm, 1040+50 nm.

* * * * *